US006698818B2

United States Patent
Crean

(10) Patent No.: US 6,698,818 B2
(45) Date of Patent: Mar. 2, 2004

(54) RECREATIONAL VEHICLE WITH MOVABLE BED

(75) Inventor: Johnnie R. Crean, Chino, CA (US)

(73) Assignee: Alfa Leisure, Inc., Chino, CA (US)

( * ) Notice: Subject to any disclaimer, the term of this patent is extended or adjusted under 35 U.S.C. 154(b) by 0 days.

(21) Appl. No.: 10/205,584

(22) Filed: Jul. 24, 2002

(65) Prior Publication Data

US 2004/0017096 A1 Jan. 29, 2004

(51) Int. Cl.[7] .............................. A47C 17/80; B60P 3/39
(52) U.S. Cl. ..................... 296/175; 296/26.13; 296/165; 5/118
(58) Field of Search .......................... 296/26.01, 26.12, 296/26.13, 156, 165, 170, 171, 172, 175, 176; 5/118; 52/67

(56) References Cited

U.S. PATENT DOCUMENTS

| | | | |
|---|---|---|---|
| 1,536,518 A | 5/1925 | Osborn | 52/67 |
| 2,150,615 A | 3/1939 | Sword | 296/26 |
| 2,177,394 A | 10/1939 | Pierce | 296/26 |
| 2,225,319 A | 12/1940 | Rollo | 296/23 |
| 2,606,057 A | 8/1952 | Johnson | 296/23 |
| 2,704,223 A | 3/1955 | Houdart | 296/26 |
| 2,757,418 A * | 8/1956 | Bergstrom | 52/67 |
| 2,876,035 A | 3/1959 | Houdart | 296/26 |
| 3,106,750 A | 10/1963 | Jarman | 20/2 |
| 3,341,986 A | 9/1967 | Brosig | 52/67 |
| 3,572,809 A | 3/1971 | Buland | 296/23 |
| 3,719,386 A | 3/1973 | Puckett et al. | 296/26 |
| 3,740,088 A | 6/1973 | Ratcliff | 296/23 C |
| 3,850,470 A | 11/1974 | Trelle | 296/23 C |
| 3,915,492 A | 10/1975 | Agnese | 296/23 C |
| 4,106,732 A | 8/1978 | Whiting | 296/23 C |
| 4,109,954 A | 8/1978 | Wall | 296/23 A |
| 4,480,866 A | 11/1984 | Komatsu | 296/21 |
| 4,500,132 A | 2/1985 | Yoder | 296/171 |
| RE32,262 E | 10/1986 | Stewart | 296/171 |
| 4,652,041 A | 3/1987 | Barber et al. | 296/171 |
| 4,729,594 A | 3/1988 | Hoff | 296/161 |
| 4,955,661 A | 9/1990 | Mattice | 296/171 |
| 4,960,299 A | 10/1990 | Steadman | 296/26 |
| 5,061,001 A | 10/1991 | Madden et al. | 296/26 |
| 5,090,749 A | 2/1992 | Lee | 296/171 |
| 5,171,056 A | 12/1992 | Faludy et al. | 296/163 |
| 5,237,782 A | 8/1993 | Cooper | 52/67 |
| 5,291,701 A | 3/1994 | Delacollete et al. | 52/67 |
| 5,560,444 A | 10/1996 | Tiedge | 180/209 |
| 5,620,224 A | 4/1997 | DiBiagio et al. | 296/26 |

(List continued on next page.)

FOREIGN PATENT DOCUMENTS

DE 3347322 A1 * 7/1985 .................. 296/172

OTHER PUBLICATIONS

Brochure: Ideal from Alfa, 11/96.

Primary Examiner—D. Glenn Dayoan
Assistant Examiner—Paul Chenevert
(74) Attorney, Agent, or Firm—Knobbe, Martens, Olson & Bear, LLP

(57) ABSTRACT

A slideout-bed coupling system for a recreational vehicle that allows the bed to be positioned at desirable locations when the slideout is in retracted and extended configurations. By selectively coupling the slideout to the bed during the movement operation of the slideout, the bed's position relative to its surrounding can be controlled. In one embodiment, the bed's axis is oriented to be parallel to the longitudinal axis of the recreational vehicle, and the bed partially moves when the slideout extends. As such, when the slideout is in the retracted configuration, the bed can be positioned to provide selected access to the one or more side of the bed. When the slideout is in the extended configuration, the coupling system allows the bed to be positioned to provide enhanced accessible clearance to both sides of the bed.

48 Claims, 11 Drawing Sheets

U.S. PATENT DOCUMENTS

| | | | |
|---|---|---|---|
| 5,634,683 A | 6/1997 | Young | 296/165 |
| 5,658,031 A | 8/1997 | DiBiagio et al. | 296/26 |
| 5,658,032 A | 8/1997 | Gardner | 296/26 |
| 5,673,962 A | 10/1997 | Maieli et al. | 296/164 |
| 5,706,616 A | 1/1998 | Fernandez | 52/143 |
| 5,785,373 A | 7/1998 | Futrell et al. | 296/26.01 |
| 5,788,306 A | 8/1998 | DiBiagio et al. | 296/26.02 |
| 5,791,715 A | 8/1998 | Nebel | 296/26 |
| 5,800,002 A | 9/1998 | Tiedge et al. | 296/26 |
| 5,833,294 A | 11/1998 | Williams et al. | 296/24.1 |
| 5,894,698 A | 4/1999 | Dewald, Jr. et al. | 52/67 |
| 5,902,001 A | 5/1999 | Schneider | 296/26.13 |
| 5,915,774 A | 6/1999 | Tiedge | 296/26.13 |
| 5,951,082 A | 9/1999 | DiBiagio et al. | 296/26.13 |
| 5,983,576 A | 11/1999 | Hanser et al. | 52/67 |
| 6,007,142 A | 12/1999 | Gehman et al. | 296/171 |
| 6,048,016 A | 4/2000 | Futrell et al. | 296/26.13 |
| 6,098,346 A | 8/2000 | Miller et al. | 52/67 |
| 6,134,724 A * | 10/2000 | Brown | 5/18.1 |
| 6,170,903 B1 | 1/2001 | Crean | 296/168 |
| 6,209,939 B1 * | 4/2001 | Wacker | 296/24.1 |
| 6,224,126 B1 | 5/2001 | Martin et al. | 296/26.01 |
| 6,227,607 B1 | 5/2001 | Dewald, Jr. et al. | 296/165 |
| 6,231,115 B1 | 5/2001 | Crean | 296/182 |
| 6,257,638 B1 | 7/2001 | Graber | 296/26.09 |
| 6,293,612 B1 | 9/2001 | Crean | 296/175 |
| 6,345,854 B1 | 2/2002 | McManus | 296/26.13 |

* cited by examiner

RECREATIONAL VEHICLE WITH MOVABLE BED

BACKGROUND OF THE INVENTION

1. Field of the Invention

The present invention relates to recreational vehicles and, in particular, relates to a movable bed on a slideout that increases the living quarter space inside the recreational vehicle.

2. Description of the Related Art

Recreational vehicles (RVs) provide users with comforts and amenities of a home while travelling. While the sizes and levels of amenities vary, RVs have limitations on overall dimensions dictated by vehicle codes. As a result, living quarter space is at a premium and floor plans of RVs need to be carefully designed to optimize the use of the available space.

One popular method of increasing the living quarter space in the RV is to use one or more slideouts. Once the RV is stationary and secured, the slideout extends out, usually laterally, so as to increase the size of the volume of the living quarter space. The slideout can be actuated in a variety of manner, and can substantially increase the usable space inside the RV.

In many instances, the slideout is interconnected to a piece of furnishing such that the furnishing moves with the slideout. One such furniture that may move with the slideout is a bed in a bedroom. The bed is typically fixedly coupled to a mechanism that actuates the slideout. Because of such a fixed coupling, the manner in which the bed is arranged in the bedroom or how far the slideout can extend are often limited. For example, designers of the RV may wish to provide sufficient spaces next to different sides of the bed when the slideout is in the extended configuration. Given such a requirement, and because the bed is fixedly coupled to the slideout, the bed may move too close to the side opposite from the slideout when the slideout retracts. Thus the bed may be cramped to one side of the bedroom when the slideout is in the retracted configuration.

From the foregoing, there is a need for an improved system that couples furniture in an RV to a slideout. There is a need for an improved bedroom slideout that couples to the bed in an improved manner.

SUMMARY OF THE INVENTION

The aforementioned needs are satisfied by one aspect of the invention that relates to a recreational vehicle comprising a chassis adapted for rolling movement over a ground, and a main housing attached to the chassis. The housing defines an interior living space for the recreational vehicle and includes two side walls and a front and a rear wall. The recreational vehicle further comprises an extendable housing movably mounted in a first side wall of the main housing. The extendable housing has an exterior side wall that is substantially parallel to the first side wall of the main housing. The extendable housing is movable between a retracted position where the exterior side wall of the extendable housing is positioned proximate the first side wall of the main housing, and an extended position where the extendable housing extends out from the first side wall of the main housing so as to increase the living space of the main housing. The recreational vehicle further comprises a bed having two sides, a head and a foot that define a longitudinal axis of the bed, where the bed is mounted within the housing such that the longitudinal axis of the bed is generally parallel to the side walls. The recreational vehicle further comprises a movement mechanism that mechanically couples the bed to the extendable housing. When the extendable housing is moved from the retracted position into the extended position, the longitudinal axis of the bed is moved laterally in the direction of travel of the extendable housing.

In one embodiment, the main housing defines a bedroom with the bed positioned therein. The longitudinal axis of the bed is generally centered in an area defined by the main housing and the extendable housing when the extendable housing is in the extended position. The orientation of the bed when the extendable housing is in the extended position is selected so as to provide spaces between the sides of the bed and their respective side walls of the main housing and the extended housing. The spaces facilitate easy access to both sides of the bed. The longitudinal axis of the bed is generally centered in an area defined by the main housing and the extendable housing when the extendable housing is in the retracted position. The centering of the bed in the area defined by the main housing and the retracted extendable housing facilitates similar access to both sides of the bed.

In one embodiment, the movement mechanism comprises a carriage that moves the extendable housing. The movement mechanism further comprises a latching member attached to the carriage, with the latching member adapted to engage the bed at selected instances thereby allowing the bed to move with the extendable housing when the latching member is engaged with the bed. The bed defines at least one catch adapted to receive the latching member. The latching member engaging the catch couples the bed and the extendable housing and the latching member disengaging from the catch uncouples the bed and the extendable housing.

In another embodiment, the movement mechanism comprises a carriage that moves the extendable housing. The movement mechanism further comprises a rod member attached to the carriage and extending laterally, with the rod member adapted to engage the bed at selected instances thereby allowing the bed to move with the extendable housing when the rod member is engaged with the bed. The bed defines a latching member adapted to couple to the rod member at selected instances as the rod member moves laterally. The latching member defines an aperture dimensioned to allow the rod member to extend therethrough. The movement mechanism further comprises a first and a second movement limiter attached to the rod member at selected locations such that the first and second limiters limit the relative motion of rod member with the bed. The first and second limiters are positioned so as to allow the bed to be generally centered laterally when the extendable housing is retracted and when the extendable housing is extended.

In one embodiment of the recreational vehicle, the main housing defines a bedroom with the bed positioned therein. The extendable housing is positioned in the first side wall laterally adjacent the bedroom. The recreational vehicle further comprises a closet that is positioned within the extendable housing. The movement mechanism couples the bed to the extendable housing such that when the extendable housing is in the retracted position, one side of the bed and the closet define a first space that is accessible by an occupant, and the other side of the bed is adjacent the side wall opposite from the first side wall. The movement mechanism couples the bed to the extendable housing such that when the extendable housing is in the extended position, one side of the bed and the closet define a first extended space and the other side of the bed and the side wall opposite from the first side wall define a second extended space. Both the first and second extended spaces are dimensioned to be accessible by the occupant.

In one embodiment, the movement mechanism comprises a carriage that moves the extendable housing. The movement mechanism further comprises a cog that is attached to the carriage and extends into a laterally extending slot defined by the underside of the bed. The slot has a first and a second end and is dimensioned with respect to the cog such that the cog can move laterally between the first and second ends without moving the bed. The movement mechanism further comprises rollers attached to the bottom of the bed to allow lateral rolling motion of the bed when the bed is urged to move laterally by the cog engaging and pushing against one of the ends of the slot.

In one embodiment, the recreational vehicle is a motorhome. In another embodiment, the recreational vehicle is a fifth-wheel trailer. One embodiment of the fifth-wheel trailer includes an upper level and a lower level and a slideout that covers portions of the upper and lower levels and where the bedroom is located on the upper level.

Another aspect of the invention relates to a recreational vehicle comprising a chassis adapted for rolling movement over a ground and a housing attached to the chassis. The housing defines an interior living space and includes two side walls that extend along a longitudinal axis of the housing. A portion of the housing defines a bedroom. The recreational vehicle further comprises an extendable housing that is attached to one of the side walls of the housing at a location adjacent the bedroom, where the extendable housing increases the width of the bedroom. The recreational vehicle further comprises a bed having a longitudinal axis positioned within the bedroom such that the longitudinal axis of the bed is parallel to the longitudinal axis of the housing. The bed is movable by being coupled to the extendable housing so as to move in a direction perpendicular to the longitudinal axis of the housing in response to movement of the extendable housing.

In one embodiment, the recreational vehicle further comprises a movement mechanism that mechanically couples the bed to the extendable housing such that when the extendable housing is moved from a retracted position into an extended position, the longitudinal axis of the bed is moved laterally in the direction of travel of the extendable housing. The orientation of the bed when the extendable housing is in the extended position is selected such that the bed is centered laterally within the bedroom. The orientation of the bed when the extendable housing is in the retracted position is selected such that the bed is centered laterally within the bedroom.

In one embodiment, the movement mechanism comprises a carriage that moves the extendable housing. The movement mechanism further comprises a latching member attached to the carriage, with the latching member adapted to engage the bed at selected instances thereby allowing the bed to move with the extendable housing when the latching member is engaged with the bed. The bed defines at least one catch adapted to receive the latching member, where the latching member engaging the catch couples the bed and the extendable housing, and where the latching member disengaging from the catch uncouples the bed and the extendable housing.

In one embodiment, the movement mechanism comprises a carriage that moves the extendable housing where the movement mechanism further comprises a rod member attached to the carriage and extending laterally, with the rod member adapted to engage the bed at selected instances thereby allowing the bed to move with the extendable housing when the rod member is engaged with the bed. The bed defines a latching member adapted to couple to the rod member at selected instances as the rod member moves laterally. The latching member defines an aperture dimensioned to allow the rod member to extend therethrough. The movement mechanism further comprises a first and a second movement limiter attached to the rod member at selected locations such that the first and second limiters limit the relative motion of rod member with the bed. The first and second limiters are positioned so as to allow the bed to be generally centered laterally when the extendable housing is retracted and when the extendable housing is extended.

In one embodiment, the recreational vehicle further comprises a closet that is positioned within the extendable housing adjacent the bedroom. The movement mechanism couples the bed to, the extendable housing such that when the extendable housing is in the retracted position, one side of the bed and the closet define a first space that is accessible by an occupant, and the other side of the bed is adjacent the side wall opposite from the first side wall. The movement mechanism couples the bed to the extendable housing such that when the extendable housing is in the extended position, one side of the bed and the closet define a first extended space and the other side of the bed and the side wall opposite from the first side wall define a second extended space. Both the first and second extended spaces are dimensioned to be accessible by the occupant.

In one embodiment, the movement mechanism comprises a carriage that moves the extendable housing. The movement mechanism further comprises a cog that is attached to the carriage and extends into a laterally extending slot defined by the underside of the bed. The slot has a first and a second end and is dimensioned with respect to the cog such that the cog can move laterally between the first and second ends without moving the bed. The movement mechanism further comprises rollers attached to the bottom of the bed to allow lateral rolling motion of the bed when the bed is urged to move laterally by the cog engaging and pushing against one of the ends of the slot.

In one embodiment, the recreational vehicle is a motorhome. In another embodiment, the recreational vehicle is a fifth-wheel trailer. One embodiment of the fifth-wheel trailer includes an upper level and a lower level and a slideout that covers portions of the upper and lower levels and where the bedroom is located on the upper level.

Yet another aspect of the invention relates to an apparatus for moving a bed in a bedroom defined by a main housing and an extendable housing of a recreational vehicle. The apparatus comprises a first means for coupling the extendable housing to the main housing such that the extendable housing can be in a retracted configuration and an extended configuration. The extendable housing moves by a first amount when transitioning between the retracted and extended configurations. The apparatus further comprises a second means for coupling the extendable housing to the bed such that the bed moves by a second amount along the direction of motion of the extendable housing when the extendable housing moves by the first amount.

In one embodiment, the first amount is greater than the second amount. The first means comprises a carriage that allows the extendable housing to move laterally between the retracted configuration and the extended configuration. In one embodiment, the second means comprises a movement mechanism that includes a latching member attached to the carriage, with the latching member adapted to engage the bed at selected instances thereby allowing the bed to move with the extendable housing when the latching member is engaged with the bed. The second means further comprises the bed defining at least one catch adapted to receive the latching member wherein the latching member engaging the catch couples the bed and the extendable housing and wherein the latching member disengaging from the catch uncouples the bed and the extendable housing.

In another embodiment, the second means comprises a movement mechanism that includes a rod member attached to the carriage and extending laterally, with the rod member adapted to engage the bed at selected instances thereby allowing the bed to move with the extendable housing when the rod member is engaged with the bed. The second means further comprises the bed defining a latching member adapted to couple to the rod member at selected instances as the rod member moves laterally. The latching member defines an aperture dimensioned to allow the rod member to extend therethrough. The second means further comprises a first and a second movement limiter attached to the rod member at selected locations such that the first and second limiters limit the relative motion of rod member with the bed. The first and second limiters are positioned so as to allow the bed to be selectively positioned laterally within the bedroom when the extendable housing is retracted and when the extendable housing is extended.

In another embodiment, the second means comprises a movement mechanism that includes a cog that is attached to the carriage and extends into a laterally extending slot defined by the underside of the bed. The slot has a first and a second end and is dimensioned with respect to the cog such that the cog can move laterally between the first and second ends without moving the bed. The movement mechanism further comprises rollers attached to the bottom of the bed to allow lateral rolling motion of the bed when the bed is urged to move laterally by the cog engaging and pushing against one of the ends of the slot. The slot and the cog are configured to allow the bed to be selectively positioned laterally within the bedroom when the extendable housing is retracted and when the extendable housing is extended.

DETAILED DESCRIPTION OF THE PREFERRED EMBODIMENT

Figure 1A:
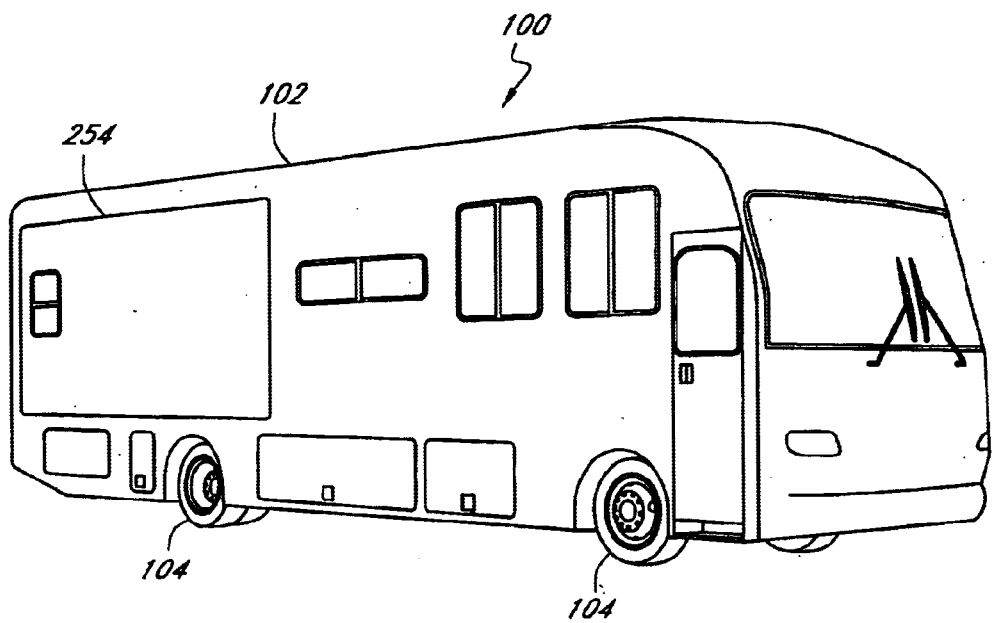
FIG. 1A illustrates one embodiment of a recreational vehicle, a motorhome.
Figure 1B:
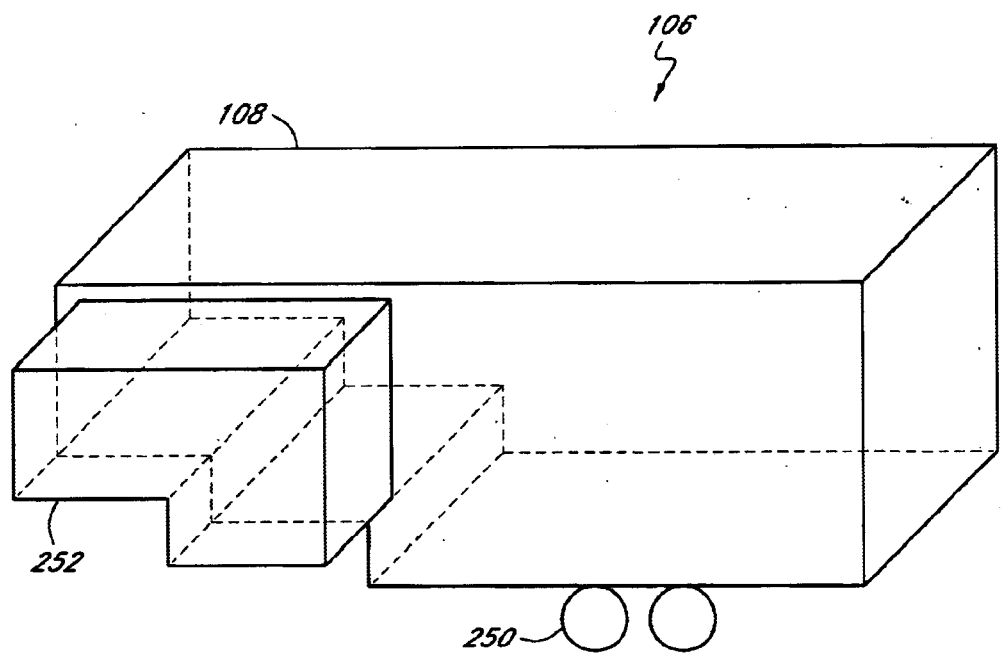
FIG. 1B illustrates another embodiment of the recreational vehicle, a fifth-wheel trailer.

Reference will now be made to the drawings wherein like numerals refer to like parts throughout. FIGS. 1A and B illustrate two possible embodiments of a recreational vehicle (RV). A motorhome 100 is one type of the RV, and comprises a main housing 102 mounted on wheels 104 via a chassis (not shown), and is typically self propelled. The motorhome 100 further comprises at least one extendable housing 254 (also referred to as a slideout) that expands the volume of a space defined by the main housing 102 and the slideout 254.

Another embodiment of the RV, a fifth-wheel trailer 106 also comprises a main housing 108 mounted on wheels 250. Unlike the motorhome, however, the fifth-wheel trailer 106 is towed by a towing vehicle. The fifth-wheel trailer 106 further comprises at least one slideout 252. In one embodiment, the slideout 252 may be of type that services two levels of the main housing 108, such as the apparatus disclosed in a U.S. Pat. No. 6,170,903 issued to the Applicant.

In the description hereinbelow, the slideout is described in context of a motorhome. However, it will be understood that the novel concept described herein may be implemented on other types of RVs such as, but not limited to, the fifth wheel trailer and other types of trailers.

Figure 2:
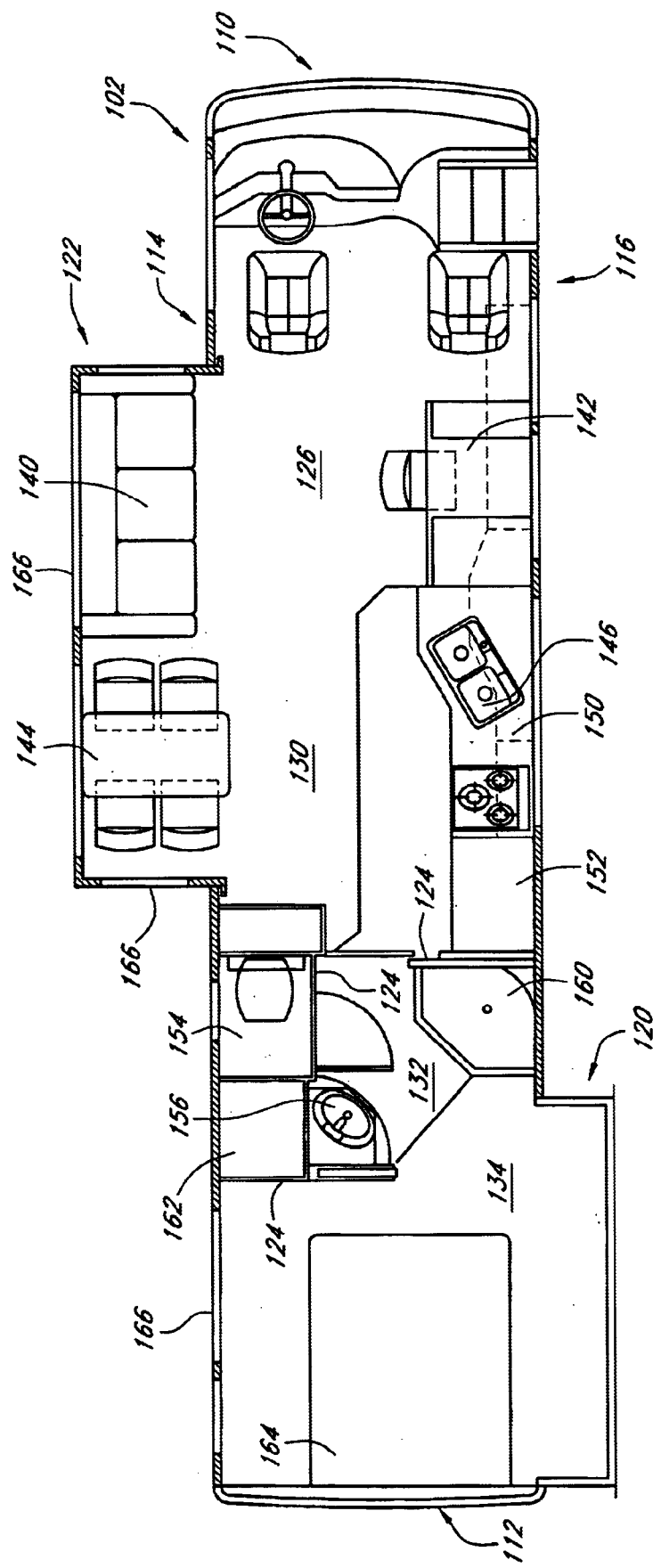
FIG. 2 illustrates an exemplary floor plan of a living space defined by a main housing and at least one extendable housing of the recreational vehicle.

FIG. 2 illustrates an exemplary floor plan of the RV having the main housing 102 defined by a front wall 110, a rear wall 112, and two side walls 114 and 116. The RV further comprises at least one slideout, in this case a first and second slideouts 120 and 122. The four walls 110, 112, 114, 116 of the main housing and the slideouts 120, 122 define an interior living space that is partitioned into various rooms or areas by a plurality of walls 124.

In the exemplary floor plan, the living space comprises a living room 126, a kitchen 130, a bathroom 132, and a bedroom, 134. The living room 126 includes amenities such as a couch 140 and a desk 142. The kitchen 130 includes amenities such as a dining table 144, a sink 146, a range/ stove 150, and a refrigerator 152. The bathroom 132 includes a lavatory 154, a sink 156, and a shower 160. The exemplary living space also includes a washer/dryer combination 162. The bedroom 134 includes a bed 164 and other amenities such as a wardrobe and drawers (not shown). The main housing 102 and the slideouts 120, 122 define a plurality of windows 166 that enhances the experience of living in the RV.

In the embodiment of the RV illustrated in FIG. 2, the head of the bed is positioned adjacent the rear wall 112, and the foot of the bed 164 points towards the front. The head and foot define the longitudinal axis of the bed 164 that is generally parallel with the two side walls 114, 116. The manner in which the bed 164 is coupled to the slideout 120 is described below.

Figure 3A:
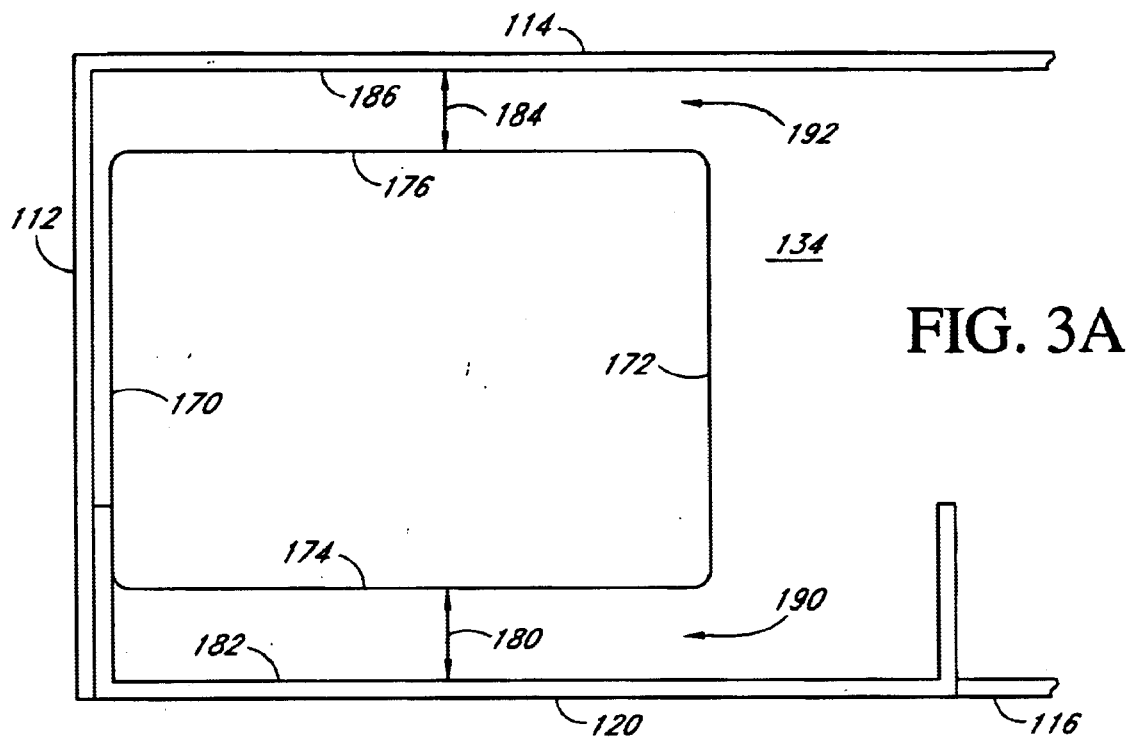
FIGS. 3A–B illustrate a retracted and an extended configuration of an extendable housing formed at a bedroom of the recreational vehicle, showing how the bed may move relative to the bedroom and the extendable housing.

FIGS. 3A, B illustrate orientations of the bed 164 relative to the bedroom 134 when the slideout 120 is in its retracted and extended positions. As previously described, the head of the bed, labeled as 170, is positioned adjacent the rear wall 112, and the foot of the bed, labeled as 172, points towards the front. Alternatively, the head-foot orientation of the bed 164 may be reversed without departing from the spirit of the invention.

The bed 164 further comprises first and second lateral sides 174 and 176. The first lateral side 174 is adjacent to and generally parallel to a first side wall 182 (in the illustrated embodiment, wall 182 is part of the slideout 120). Similarly, the second lateral side 176 is adjacent to and generally parallel to a second side wall 186 (in the illustrated embodiment, wall 186 is a portion of the main housing side wall 114). When the slideout 120 is in the retracted configuration as in FIG. 3A, the first lateral side 174 of the bed 164 and the first side wall 182 define a first space 190 having a first lateral dimension 180. Similarly, the second lateral side 176 of the bed 164 and the second side wall 186 define a second space 192 having a second lateral dimension 184. Preferably, the first and second lateral dimensions 180 and 184 are selected so as to allow easy access to and from the first and second lateral sides 174, 176 of the bed 164.

Figure 3B:
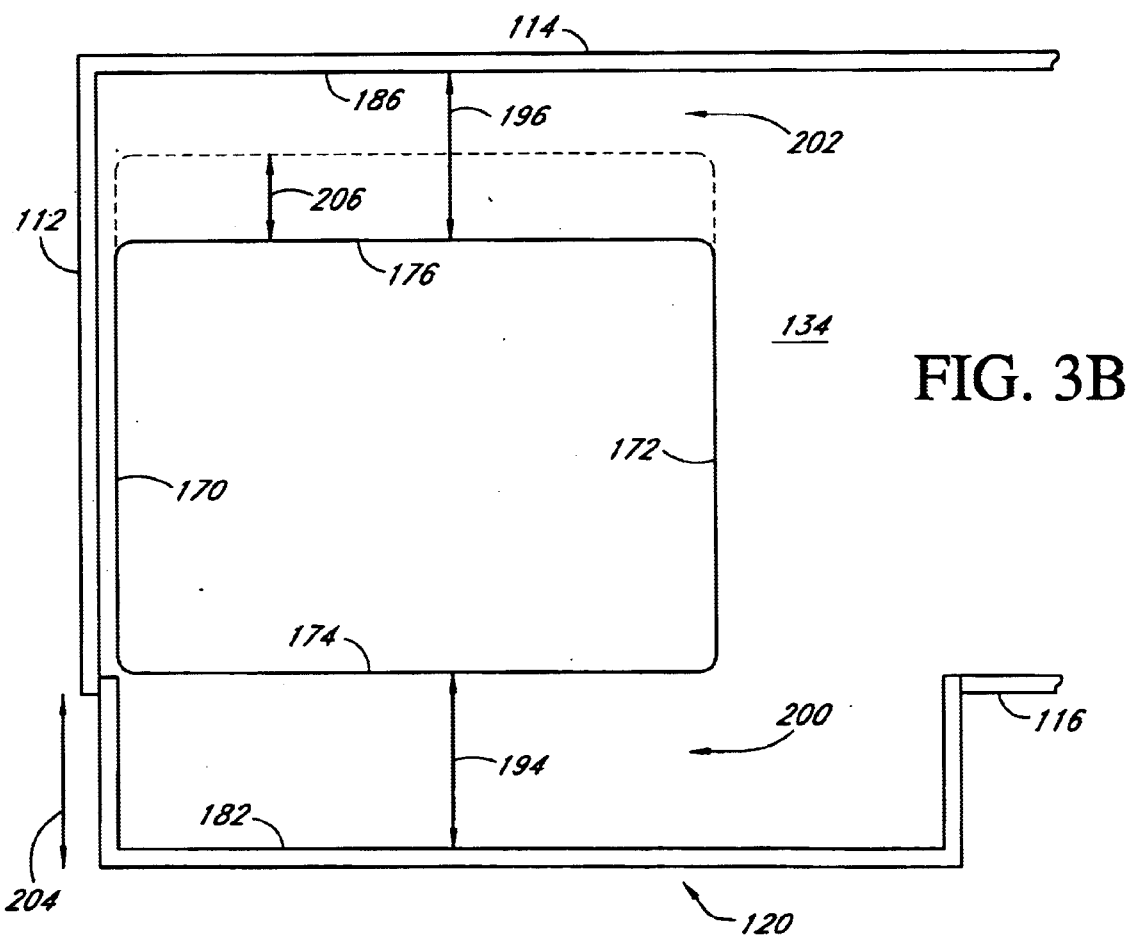

When the slideout 120 extends from the retracted configuration to the extended configuration as in FIG. 3B, the slideout 120 moves laterally by a distance 204. The bed 164, however, moves laterally by a distance 206 that is less than the distance 204. As such, a first extended space 200 defined by the first lateral side 174 of the bed 164 and the first side wall 182 has a first extended lateral dimension 194, and a second extended space 202 defined by the second lateral side 176 and the second side wall 186 has a second extended lateral dimension 196. It will be appreciated that because the slideout displacement 204 can be different than the bed displacement 206, the first and second extended lateral dimensions 194 and 196 can be advantageously selected to allow easier access to both sides of the bed.

In one embodiment, first and second lateral dimensions 180 and 184 of the retracted configuration are selected to be substantially similar, thereby allowing similar accessibility to either side of the bed 164. The first and second extended lateral dimensions 194 and 196 are also selected to be substantially similar, thereby allowing similar easier accessibility to either side of the bed 164 when the slideout 120 is extended. It will be appreciated that other combinations of the lateral dimensions may be implemented without departing from the spirit of the invention by utilizing the advantageous feature of the slideout displacement 204 being different than the bed displacement 206. A slideout-bed coupling mechanism that allows such displacement of the bed 164 relative to the slideout 120 is described below.

Figure 4A:
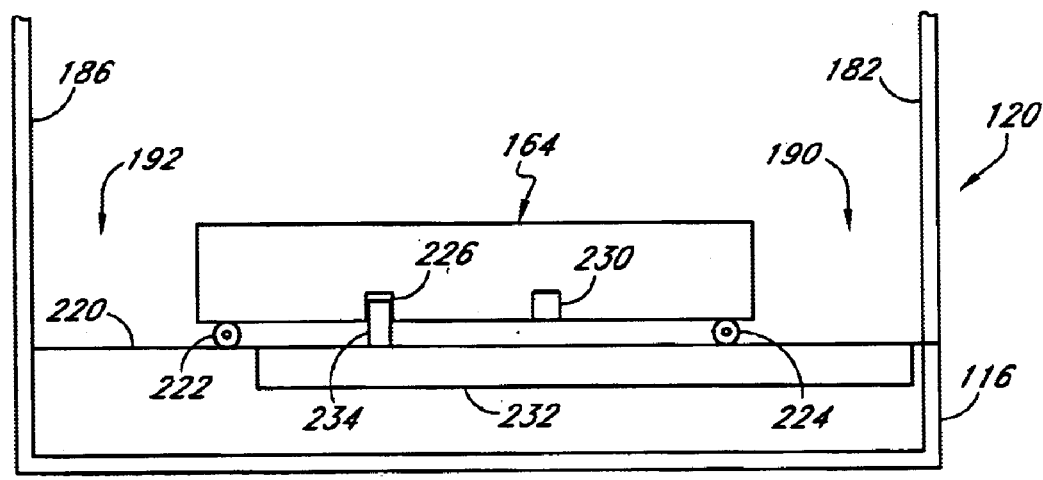
FIGS. 4A–D illustrate one possible embodiment of a movement mechanism that couples the extendable housing to the bed so as to allow the positioning of the bed illustrated in FIGS. 3A–B.
Figure 4B:
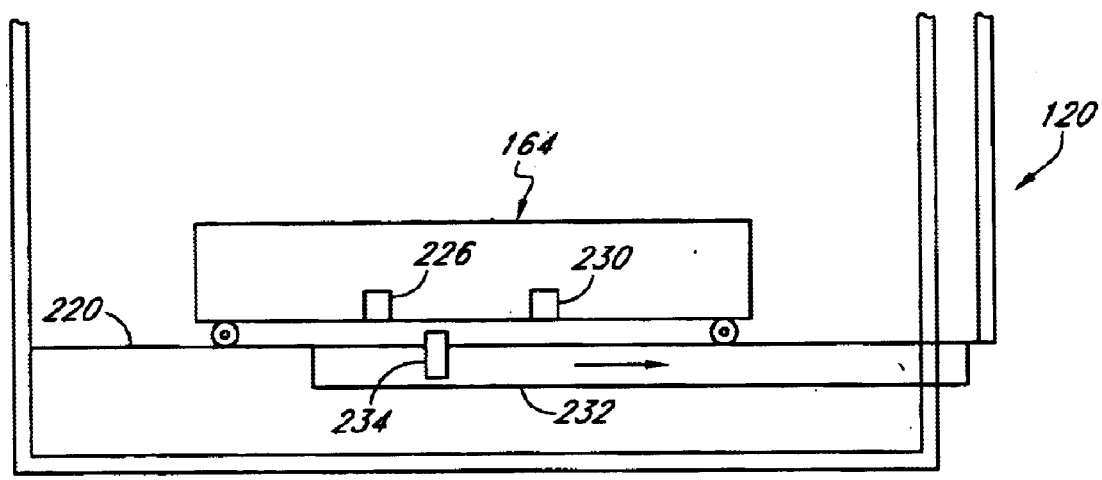
Figure 4C:
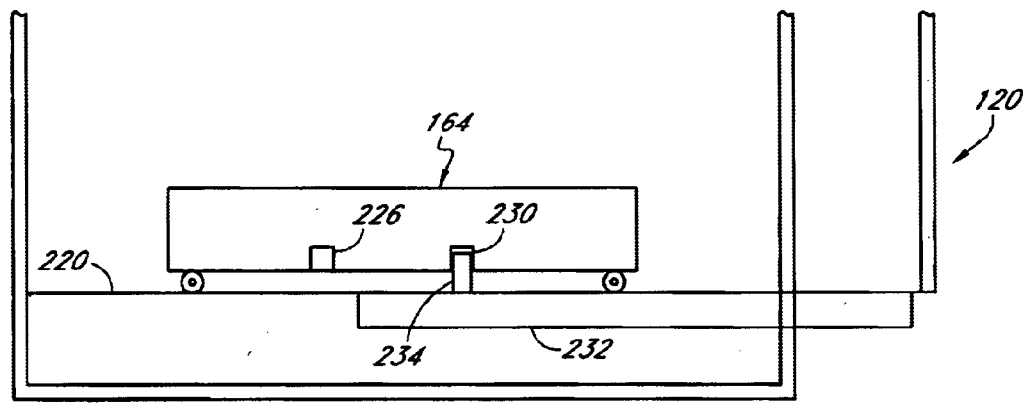

FIGS. 4A–C illustrate one possible embodiment of a slideout-bed coupling mechanism. In the sectional views, the bed 164 is depicted to be mounted on rollers 222 and 224 that allow the bed 164 to move laterally with respect to a floor 220 in a manner described below. The slideout 120 comprises a carriage 232 that supports and allows the slideout 120 to be extended and retracted. The carriage 232 and the slideout mechanism may be of conventional design known in the art, or may be similar to the apparatus of the Applicant's co-pending application entitled "Securing Mechanism for Recreational Vehicle Slide-Outs", application Ser. No. 09/949,013, filed Sep. 6, 2001, which is hereby incorporated by reference in its entirety.

The carriage 232 includes a retractable latching member 234 that is adapted to protrude upwards to engage with recesses 226 and 230 defined by the underside of the bed 164. In FIG. 4A, the slideout 120 is in the retracted configuration. As such, the sides of the bed 164 and their respective adjacent side walls (182 and 186) define the first and second spaces 190 and 192 described above. The latching member 234 is shown to be extended into the recess 226 thereby inhibiting the bed 164 from moving laterally with respect to the floor 220.

FIG. 4B illustrates a partially extended configuration of the slideout 120 as it begins its extending sequence. In particular, prior to the slideout 120 extending away from the main housing (to the right in FIG. 4B), the latching member 234 is retracted thereby temporarily uncoupling the carriage 232 (and thereby the slideout 120) from the bed 164. In one embodiment, the retraction of the latching member 234 is synchronized with the slideout mechanism such that upon actuation, the latching member 234 is retracted first before movement of the carriage 232 occurs. As the carriage 232 moves laterally, the bed 164 remains stationary with respect to the floor 220 since the bed 164 and the carriage 232 are uncoupled.

FIG. 4C also illustrates another partially extended configuration wherein the carriage 232 has moved laterally a selected distance. In particular, the carriage 232 has moved the selected distance such that the latching member 234 is aligned with the recess 230. The carriage 232 is adapted to extend the latching member 234 upward thereby allowing the latching member 234 to extend into the recess 230 so as to couple the carriage 232 to the bed 164. In one embodiment, the carriage pauses temporarily to allow the latching member 234 to engage the recess 230. As the carriage 232 resumes its lateral movement, the bed 164 is pulled along.

Figure 4D:
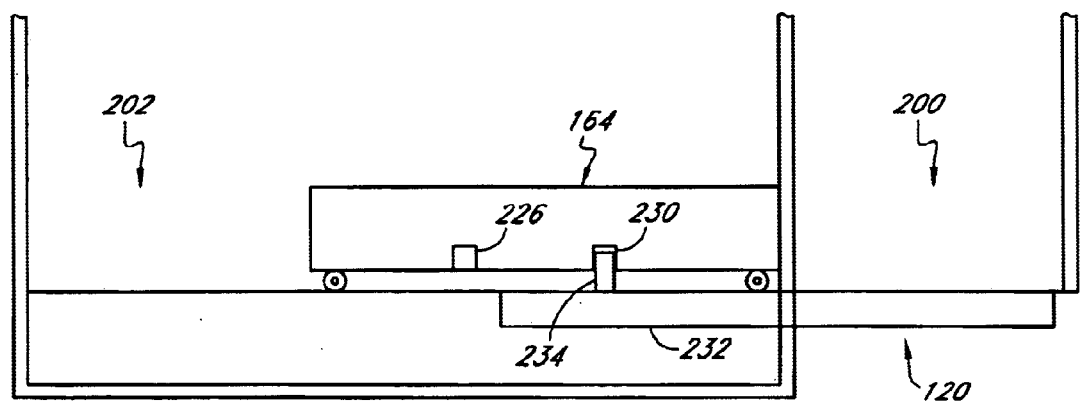

FIG. 4D illustrates the extended configuration of the slideout 120 wherein the carriage 232 has extended fully. The bed 164 is coupled to the carriage 232 by the engagement of the latching member 234 and the recess 230, thereby inhibiting further lateral movement of the bed 164 relative to the floor 220. Thus in the extended configuration of the slideout 120, the first and second extended spaces 200 and 202 are defined adjacent to the two sides of the bed as described above.

It will be appreciated that by selecting the relative spacing between the recesses 226 and 230, as well as their orientation relative to the latching member 234, the lateral dimensions of the first and second spaces 190, 192, and the first and second extended spaces 200, 202 may be selected to suit various needs. In one embodiment such as that illustrated in FIGS. 4A–D, the lateral dimensions of the first and second spaces 190, 192 are selected to be substantially equal when the slideout is in the retracted configuration. Furthermore, the lateral dimensions of the first and second extended spaces 200, 202 are also selected to be substantially equal when the slideout is in the extended configuration.

In one embodiment, the sequence of retracting the slideout 120 is reverse of the extending sequence described above. As described above, the carriage movement pauses temporarily during the stage of FIG. 4B. During the retracting sequence, such a pause in lateral movement of the carriage/bed combination allows the bed 164 to come to rest before temporarily disengaging the carriage 232 from the bed 164. Alternatively, the rolling resistance of the bed may be sufficient, and the rate of lateral movement may be sufficiently slow enough to allow the sequence to proceed without such a pause.

Figure 5A:
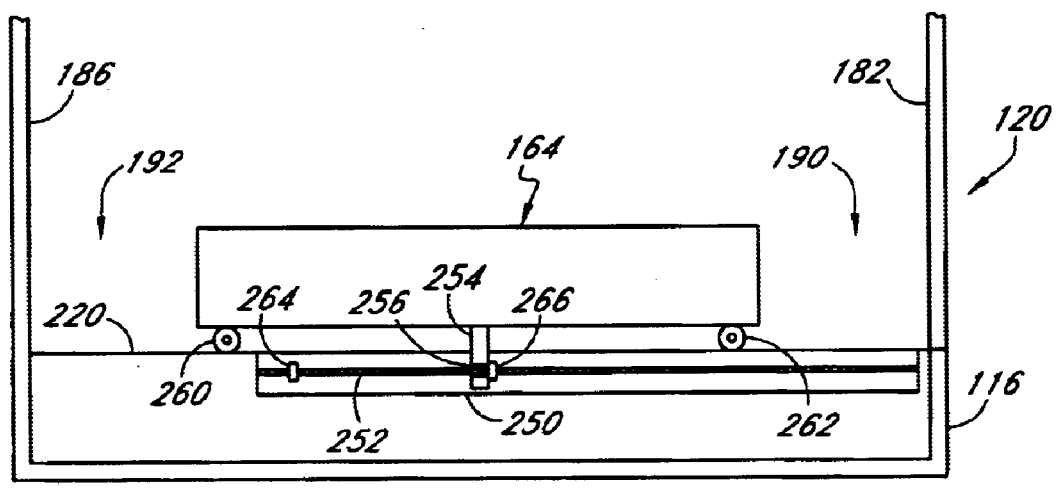
FIGS. 5A–D illustrate another embodiment of the movement mechanism that couples the extendable housing to the bed so as to allow the positioning of the bed.
Figure 5B:
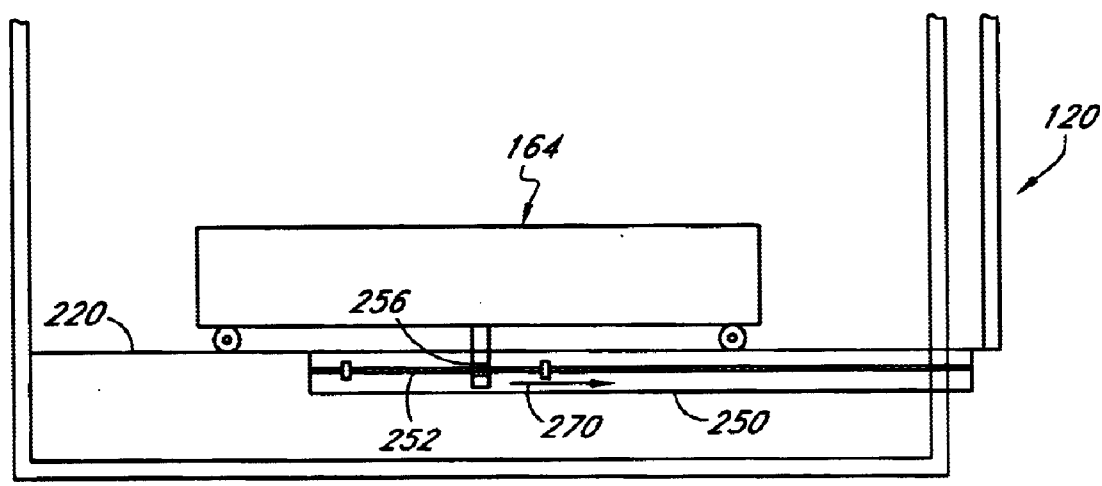
Figure 5C:
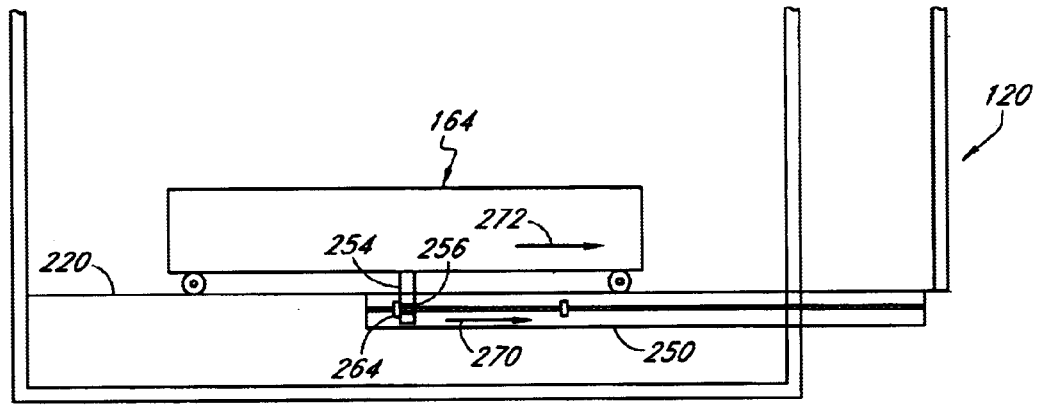

FIGS. 5A–C illustrate another embodiment of a slideout-bed coupling mechanism. In the sectional views, the bed 164 is depicted to be mounted on rollers 260 and 262 that allow the bed 164 to move laterally with respect to a floor 220 in a manner described below. The slideout 120 comprises a carriage 250 that supports and allows the slideout 120 to be extended and retracted. The carriage 250 and the slideout mechanism may be of conventional design known in the art, or may be similar to the apparatus of the Applicant's co-pending application entitled "Securing Mechanism for Recreational Vehicle Slide-Outs", application Ser. No.

09/949,013, filed Sep. 6, 2001, which is hereby incorporated by reference in its entirety.

The carriage 250 includes a retractable rod member 252 that extends laterally and is fixedly attached to the carriage 250. The rod member 252 has a cross sectional dimension that allows it to extend through an aperture 256 defined by a latching member 254 that is fixedly attached to the bed 164 and extends downwards. The rod member 252 further comprises a first movement limiter 264 and a second movement limiter 266 that limit the relative movement of the rod member 252 and the latching member 254 in a manner described below. In one embodiment, the first and second limiters 264, 266 are fixedly attached to the rod member 252 at selected locations, and are dimensioned larger than the aperture 256 on the latching member 254. As such, the latching member 254 is captured between the first and second limiters 264, 266, and is permitted to move relative to the rod member 252 therebetween.

In FIG. 5A, the slideout 120 is in the retracted configuration. As such, the sides of the bed 164 and their respective adjacent side walls (182 and 186) define the first and second spaces 190 and 192 described above. The latching member 254 is shown to be engaged with the second limiter 266. As will be apparent from the description below, the second limiter engaging the latching member 254 allows the bed 164 to move along with the rod member 252 (and thus the carriage 250) when the slideout 120 undergoes a retraction motion.

FIG. 5B illustrates a partially extended configuration of the slideout 120 as it begins its extending sequence. In particular, as the slideout 120 begins extending away from the main housing (to the right in FIG. 4B), the bed 164 remains stationary with respect to the floor 220 since the rod member 252 is allowed to extend through the aperture 256 when the aperture 256 is between the first and second limiters 264, 266. The extending motion of the rod member 252 (and thus the carriage 250) is indicated by an arrow 270.

FIG. 5C also illustrates another partially extended configuration wherein the carriage 250 has moved laterally a selected distance. In particular, the carriage 250 has moved the selected distance such that the first limiter 264 of the rod member 252 engages the latching member 254. Thus, as the carriage 250 continues its lateral movement in the direction 270, the bed 164 is pulled along in the same direction as indicated by an arrow 272.

Figure 5D:
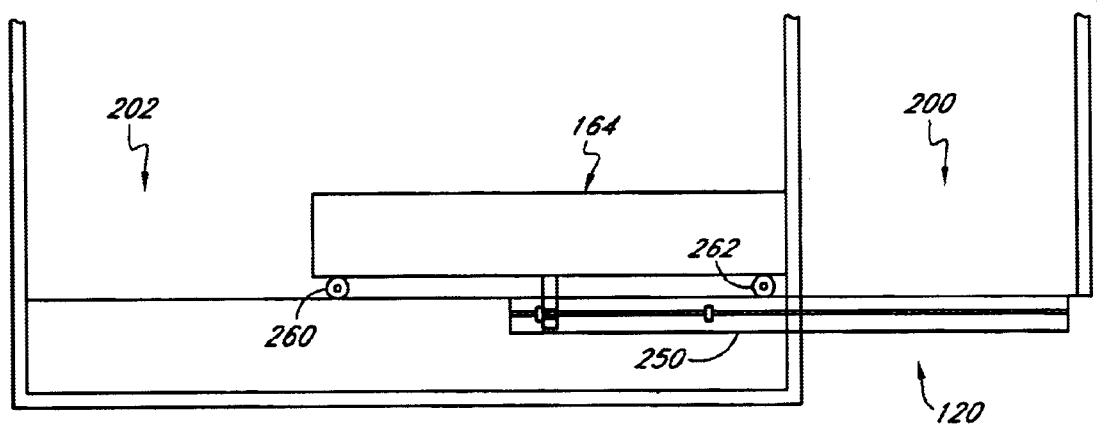

FIG. 5D illustrates the extended configuration of the slideout 120 wherein the carriage 250 has extended fully. Thus in the extended configuration of the slideout 120, the first and second extended spaces 200 and 202 are defined adjacent to the two sides of the bed as described above.

It will be appreciated that by selecting the lateral locations of latching member 254 and the first and second limiters 264, 266, the lateral dimensions of the first and second spaces 190, 192, and the first and second extended spaces 200, 202 may be selected to suit various needs. In one embodiment such as that illustrated in FIGS. 5A–D, the lateral dimensions of the first and second spaces 190, 192 are selected to be substantially equal when the slideout is in the retracted configuration. Furthermore, the lateral dimensions of the first and second extended spaces 200, 202 are also selected to be substantially equal when the slideout is in the extended configuration.

In one embodiment, the sequence of retracting the slideout 120 is reverse of the extending sequence described above. In particular, the bed 164 remains stationary as the slideout 120 retracts until the second limiter 266 engages the latching member 254. The bed 164 is then pulled along with the carriage 250 as the slideout retracts back to the retracted configuration illustrated in FIG. 5A.

In one embodiment, the rollers 260, 262 of the bed 164 provide sufficient friction so as to inhibit unwanted lateral motion of the bed 164. Alternatively, any number of lateral-motion inhibiting adaptations may be implemented, such that the bed 164 remains in a secure orientation relative to the floor when the slideout is in either retracted or extended configurations, without departing from the spirit of the invention.

Figure 6:
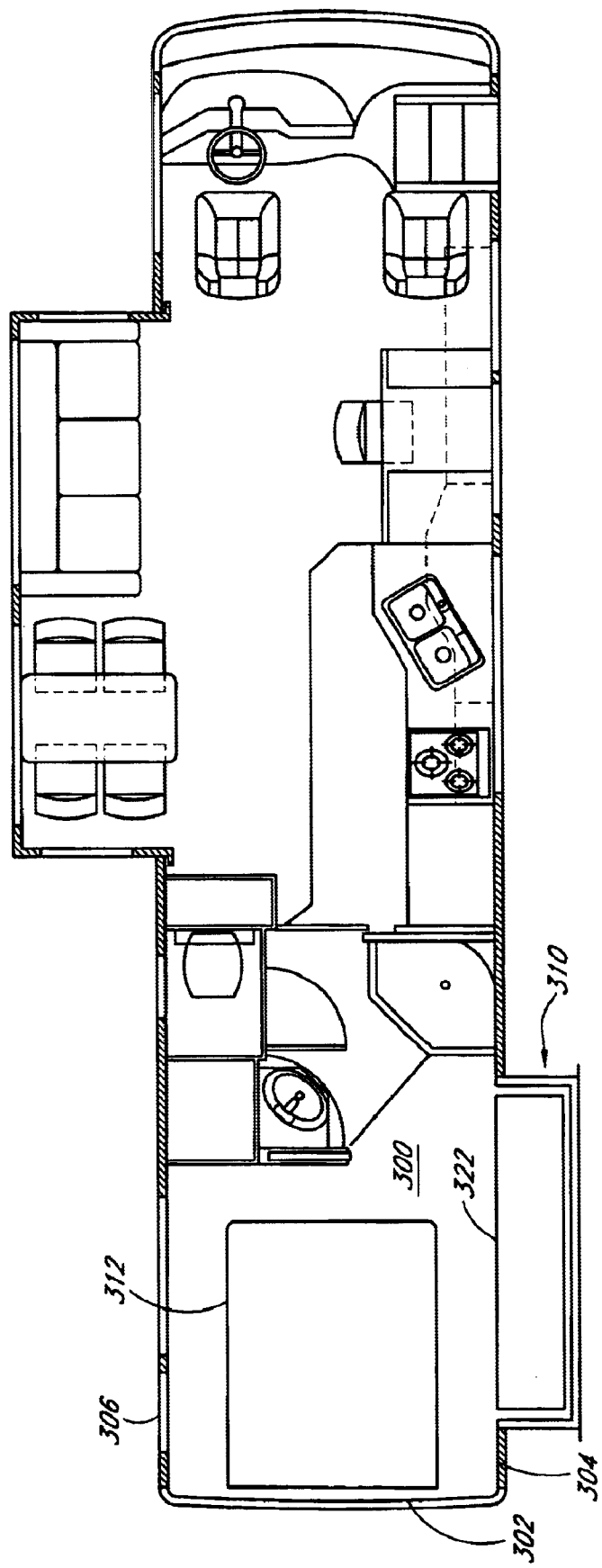
FIG. 6 illustrates one embodiment of the recreational vehicle having an extendable housing adjacent a bedroom, wherein the extendable housing defines a space for a closet.

FIGS. 6–8 now illustrate another embodiment of the RV having a slideout. In particular, as shown in FIG. 6, a slideout 310 is disposed adjacent a bedroom 300, and the slideout 310 defines a space for a closet 322. The bedroom 300 is depicted as being located adjacent the rear of the RV and being defined by a rear wall 302 and a first and a second side wall 304 and 306, respectively. It will be appreciated, however, that the bedroom 300 and a bed 312 therein may be located at other longitudinal locations within the RV without departing from the spirit of the invention.

Figure 7A:
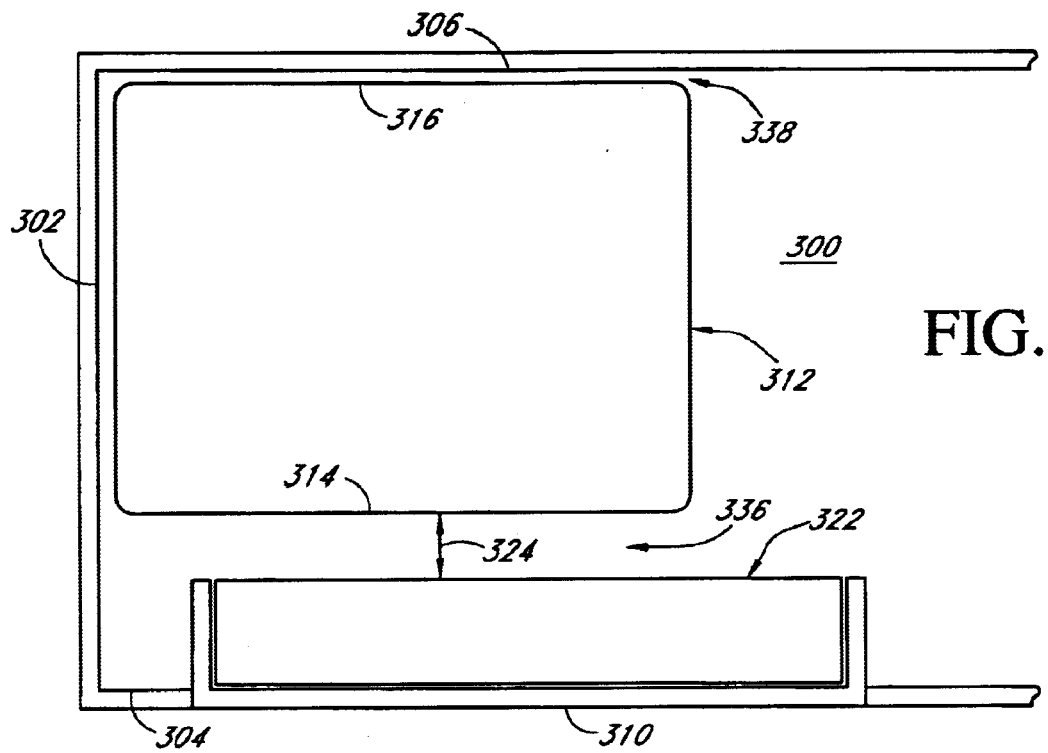
FIGS. 7A–B illustrate a retracted and an extended configuration of the extendable housing of FIG. 6, showing how a bed may move relative to the bedroom and the extendable housing.

As shown in FIGS. 7A and B, the bed 312 has a first and a second lateral side 314 and 316, respectively. Preferably, head of the bed 312 is adjacent the rear wall 302. The bed 312 is coupled to the slideout 310 in a manner described below such that when the slideout 310 is in a retracted configuration, as in FIG. 7A, the first lateral side 314 of the bed 312 and the closet 322 define a first space 336 having a first width 324. The first width 324 preferably allows an occupant to gain access to the first lateral side 314 of the bed 312 as well as the closet 322. The second lateral side 316 of the bed 312 is positioned adjacent the second side wall 306 when the slideout 310 is in the retracted configuration.

Figure 7B:
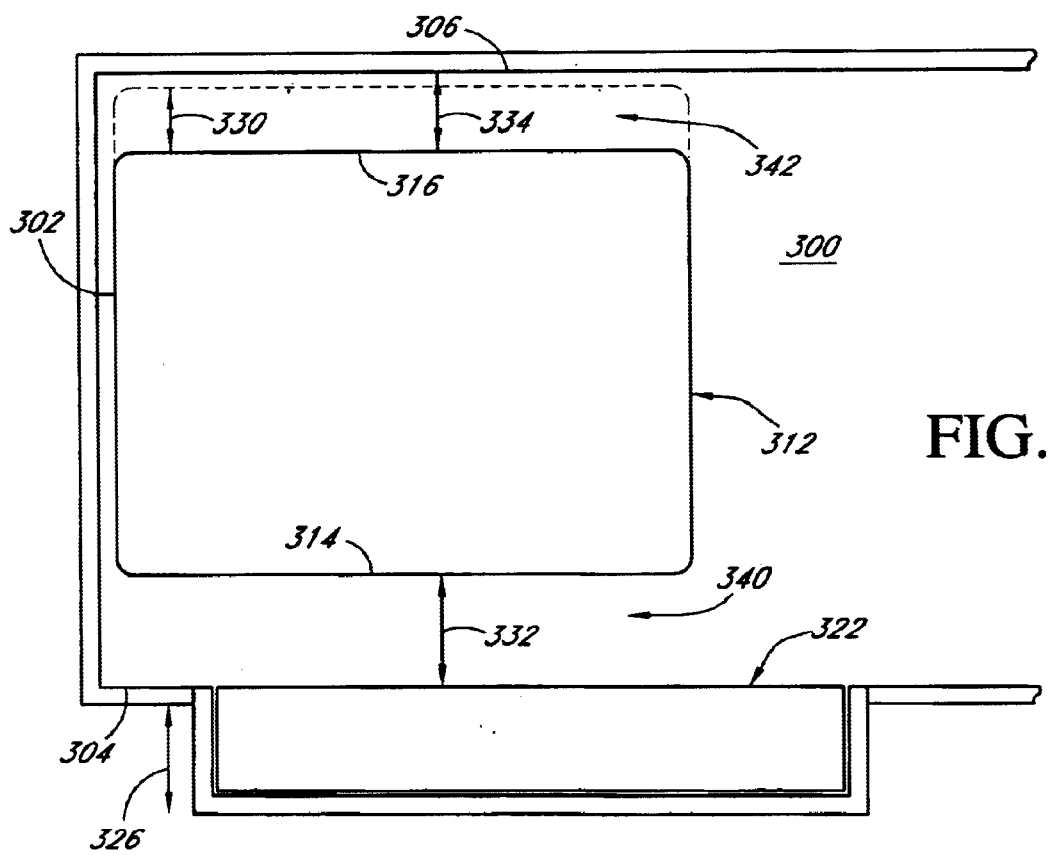

FIG. 7B illustrates the slideout 310 in its extended configuration, wherein the slideout 310 extends laterally by an amount indicated by arrow 326. The bed 312, being coupled to the slideout 310 in a manner described below, is displaced laterally by an amount indicated by arrow 330. The slideout displacement 326 is generally not the same as the bed displacement 330, and the resulting displacements yield a first extended space 340 defined by the first lateral side 314 of the bed 312 and the closet 322, and a second extended space 342 defined by the second lateral side 316 and the second side wall 306. The first extended space 340 has a lateral width 332 that preferably allows easier access to the bed 312 as well as to the closet 322 when compared to the first space 336 associated with the retracted configuration of the slideout 310. The second extended space 342 has a lateral width 334 that preferably allows the occupant to gain access to the second lateral side 316 of the bed 312 in a comfortable manner. In FIG. 7B, the first extended space 340 is depicted as being wider than the second extended space 342. It will be appreciated, however, that the slideout 310 and its coupling to the bed 312 may be configured such that first and second extended spaces 340 and 342 are similar without departing from the spirit of the invention.

FIGS. 8A–D illustrate a sequence of slideout extending operation utilizing one possible embodiment of the slideout-bed coupling. It will be appreciated that the concept of configuring the bedroom slideout 310 with the closet can utilize other coupling mechanism, such as those described above in reference to FIGS. 4 and 5, without departing from the spirit of the invention. Also, the slideout-bedroom described above in reference to FIGS. 3–5 may utilize the slideout-bed coupling described below without departing from the spirit of the invention.

Figure 8A:
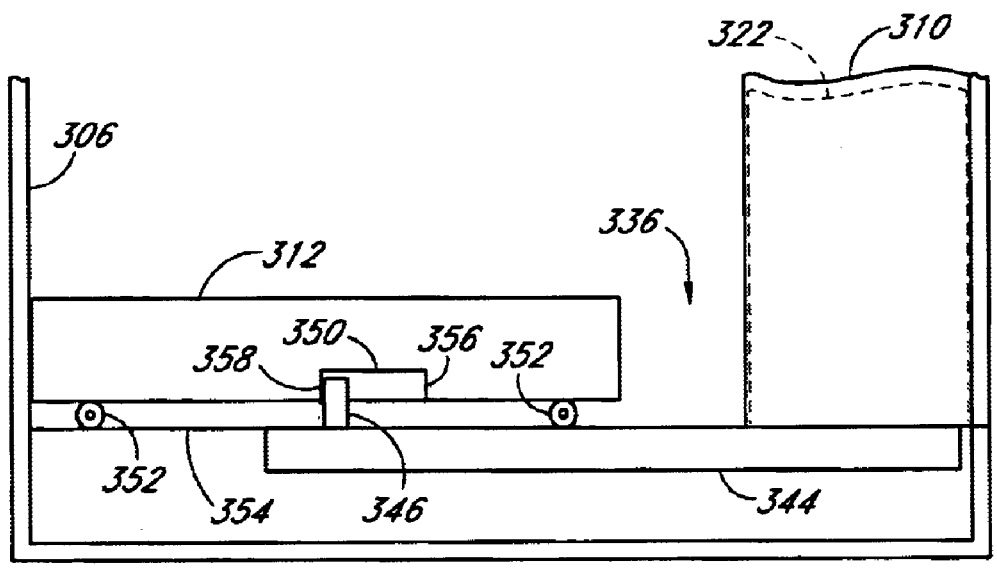
FIGS. 8A–D illustrate another embodiment of the movement mechanism that couples the extendable housing to the bed so as to allow positioning of the bed.

FIG. 8A illustrates the slideout 310 in its retracted configuration. The slideout 310 and the closet 322 therein are moved by a movement mechanism comprising a carriage 344 that is fixedly attached to the slideout 310. The movement mechanism further comprises a cog 346 that is fixedly attached to the carriage 344. The cog 346 extends upward from the carriage 344 such that a portion of the cog 346 is captured within a slot 350 defined by the underside of the bed 312. The slot 350 has a first end 356 and a second end 358, and is dimensioned such that the cog 346 can move between the first and second ends 356, 358 without moving the bed 312. When the slideout 310 is in the retracted configuration, the cog 346 engages the second end 358 of the slot 350, thereby positioning the second lateral side (316 in FIG. 7) adjacent the second side wall 306. The underside of the bed 312 also includes rollers 352 that permit the bed to roll laterally on a floor 354 when urged by the movement mechanism. In one embodiment, the rollers 352 are adapted to provide selected amount of rolling resistance so as to inhibit free lateral movement of the bed.

Figure 8B:
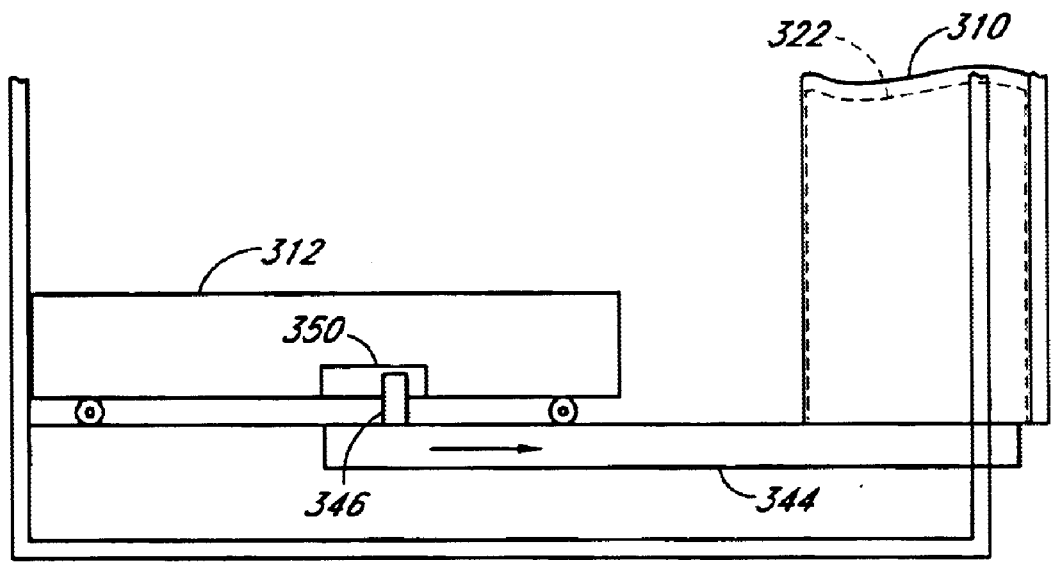
Figure 8C:
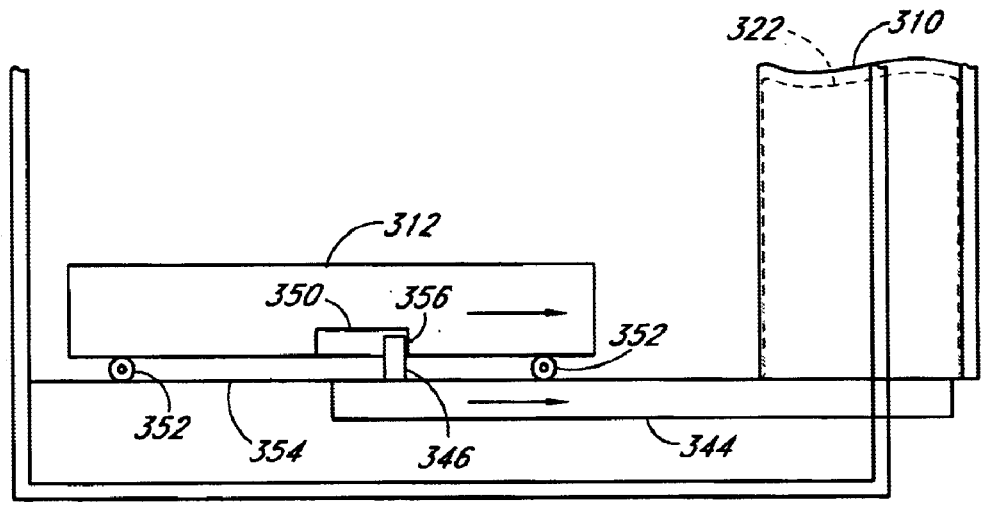

In FIG. 8B, the slideout 310 begins its lateral extending movement as indicated by the laterally pointing arrow on the carriage 344. The bed 312, however, remains stationary as the cog 346 moves within the slot 350. In FIG. 8C, the movement of the slideout progresses further, and the cog 346 engages the first end 356 of the slot 350, thereby urging the bed 312 to also move laterally (as indicated by the arrow on the bed 312).

Figure 8D:
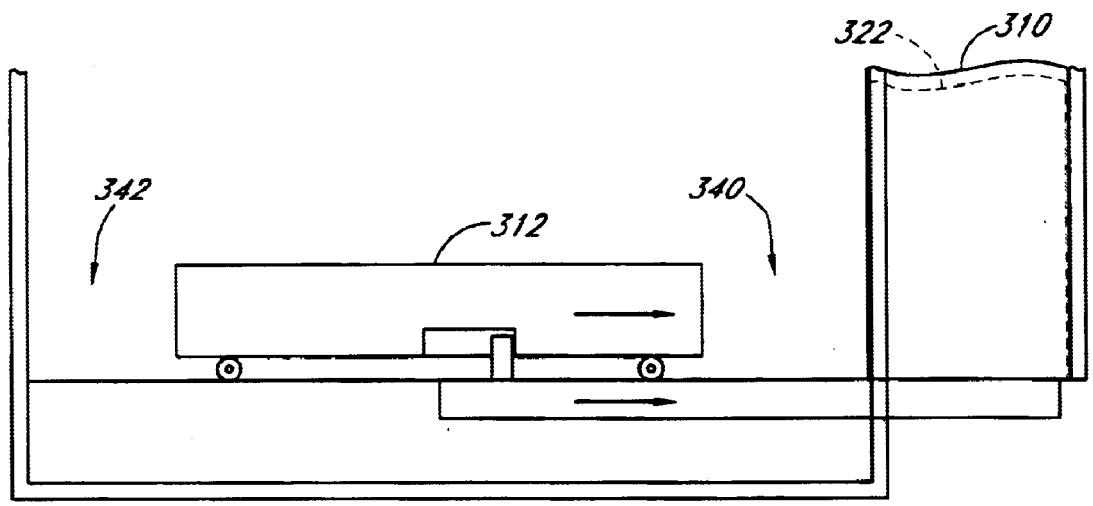

In FIG. 8D, the slideout 310 has reached its fully extended configuration and stopped, and the bed 312 has also stopped, thereby defining the first and second extended spaces 340 and 342. The retracting operation of the slideout 310 is essentially a reverse of the extending operation described above.

While the description above of the slideout-bed coupling in context of a longitudinally oriented bed, it will be appreciated that similar advantages may be realized for a bed that has other orientation relative to the bedroom. Furthermore, other articles of furniture used in the RV may also be coupled to a slideout in a similar manner to provide more flexibility in arrangement options without departing from the spirit of the invention.

Although the various embodiments of the invention has shown, described and pointed out the fundamental novel features of the invention as applied to these embodiments, it will be understood that various omissions,.substitutions and changes in the form of the detail of the device illustrated may be made by those skilled in the art without departing from the spirit of the invention. Consequently, the scope of the invention should not be limited to the foregoing description, but should be defined by the appending claims.

What is claimed is:

1. A recreational vehicle comprising:
   a chassis adapted for rolling movement over a ground;
   a main housing attached to the chassis wherein the housing defines an interior living space for the recreational vehicle and wherein the housing includes a first and second side wall and a front and a rear wall;
   an extendable housing movably mounted in the first side wall of the main housing, the extendable housing having an exterior side wall that is substantially parallel to the first side wall of the main housing wherein the extendable housing is movable between a retracted position wherein the exterior side wall of the extendable housing is positioned proximate the first side wall of the main housing and an extended position wherein the extendable housing extends out from the first side wall of the main housing so as to increase the living space of the main housing;
   a bed having two sides, a head and a foot that define a longitudinal axis of the bed wherein the bed is mounted within the housing such that the longitudinal axis of the bed is generally parallel to the side walls; and
   a movement mechanism that mechanically couples the bed to the extendable housing such that when the extendable housing is moved from the retracted position into the extended position, the longitudinal axis of the bed is moved laterally in the direction of travel of the extendable housing;
   wherein the orientation of the bed when the extendable housing is in the extended position is selected so as to provide spaces between the sides of the bed and their respective side walls of the main housing and the extended housing wherein the spaces facilitate easy access to both sides of the bed.

2. The recreational vehicle of claim 1, wherein the main housing defines a bedroom with the bed positioned therein, wherein the longitudinal axis of the bed is generally centered in an area defined by the main housing and the extendable housing when the extendable housing is in the extended position.

3. The recreational vehicle of claim 2, wherein the longitudinal axis of the bed is generally centered in an area defined by the main housing and the extendable housing when the extendable housing is in the retracted position.

4. The recreational vehicle of claim 3, wherein the centering of the bed in the area defined by the main housing and the retracted extendable housing facilitates similar access to both sides of the bed.

5. The recreational vehicle of claim 1, wherein the movement mechanism comprises a carriage that moves the extendable housing wherein the movement mechanism further comprises a latching member attached to the carriage, the latching member adapted to engage the bed at selected instances thereby allowing the bed to move with the extendable housing when the latching member is engaged with the bed.

6. The recreational vehicle of claim 5, wherein the bed defines at least one catch adapted to receive the latching member wherein the latching member engaging the catch couples the bed and the extendable housing and wherein the latching member disengaging from the catch uncouples the bed and the extendable housing.

7. The recreational vehicle of claim 1, wherein the movement mechanism comprises a carriage that moves the extendable housing wherein the movement mechanism further comprises a rod member attached to the carriage and extending laterally, the rod member adapted to engage the bed at selected instances thereby allowing the bed to move with the extendable housing when the rod member is engaged with the bed.

8. The recreational vehicle of claim 7, wherein the bed defines a latching member adapted to couple to the rod member at selected instances as the rod member moves laterally.

9. The recreational vehicle of claim 8, wherein the latching member defines an aperture dimensioned to allow the rod member to extend therethrough and wherein the movement mechanism further comprises a first and a second movement limiter attached to the rod member at selected locations such that the first and second limiters limit the relative motion of rod member with the bed.

10. The recreational vehicle of claim 9, wherein the first and second limiters are positioned so as to allow the bed to be generally centered laterally when the extendable housing is retracted and when the extendable housing is extended.

11. The recreational vehicle of claim 1, wherein the main housing defines a bedroom with the bed positioned therein and wherein the extendable housing is positioned in the first side wall laterally adjacent the bedroom.

12. The recreational vehicle of claim 11, further comprising a closet that is positioned within the extendable housing.

13. The recreational vehicle of claim 12, wherein the movement mechanism couples the bed to the extendable housing such that when the extendable housing is in the retracted position, one side of the bed and the closet define a first space that is accessible by an occupant, and the other side of the bed is adjacent the second side wall.

14. The recreational vehicle of claim 13, wherein the movement mechanism couples the bed to the extendable housing such that when the extendable housing is in the extended position, one side of the bed and the closet define a first extended space and the other side of the bed and the second side wall define a second extended space, wherein both the first and second extended spaces are dimensioned to be accessible by the occupant.

15. The recreational vehicle of claim 1, wherein the movement mechanism comprises a carriage that moves the extendable housing wherein the movement mechanism further comprises a cog that is attached to the carriage and extends into a laterally extending slot defined by the underside of the bed wherein the slot has a first and a second end and is dimensioned with respect to the cog such that the cog can move laterally between the first and second ends without moving the bed.

16. The recreational vehicle of claim 15, wherein the movement mechanism further comprises rollers attached to the bottom of the bed to allow lateral rolling motion of the bed when the bed is urged to move laterally by the cog engaging and pushing against one of the ends of the slot.

17. The recreational vehicle of claim 1, wherein the recreational vehicle is a motorhome.

18. The recreational vehicle of claim 1, wherein the recreational vehicle is a fifth-wheel trailer.

19. The recreational vehicle of claim 18, wherein the fifth-wheel trailer includes an upper level and a lower level wherein the fifth-wheel trailer comprises a slideout that covers portions of the upper and lower levels and wherein the bedroom is located on the upper level.

20. A recreational vehicle comprising:
a chassis adapted for rolling movement over a ground;
a housing attached to the chassis wherein the housing defines an interior living space and includes a first and a second side wall that extend along a longitudinal axis of the housing wherein a portion of the housing defines a bedroom;
an extendable housing that is attached to the first side wall of the housing at a location adjacent the bedroom, wherein the extendable housing increases the width of the bedroom; and
a bed having a longitudinal axis positioned within the bedroom such that the longitudinal axis of the bed is parallel to the longitudinal axis of the housing, wherein the bed is movable by being coupled to the extendable housing so as to move in a direction perpendicular to the longitudinal axis of the housing in response to movement of the extendable housing;
wherein the orientation of the bed when the extendable housing is in the extended position is selected such that the bed is centered laterally within the bedroom.

21. The recreational vehicle of claim 20, further comprising a movement mechanism that mechanically couples the bed to the extendable housing such that when the extendable housing is moved from a retracted position into an extended position, the longitudinal axis of the bed is moved laterally in the direction of travel of the extendable housing.

22. The recreational vehicle of claim 21, wherein the orientation of the bed when the extendable housing is in the retracted position is selected such that the bed is centered laterally within the bedroom.

23. The recreational vehicle of claim 21, wherein the movement mechanism comprises a carriage that moves the extendable housing wherein the movement mechanism further comprises a latching member attached to the carriage, the latching member adapted to engage the bed at selected instances thereby allowing the bed to move with the extendable housing when the latching member is engaged with the bed.

24. The recreational vehicle of claim 23, wherein the bed defines at least one catch adapted to receive the latching member wherein the latching member engaging the catch couples the bed and the extendable housing and wherein the latching member disengaging from the catch uncouples the bed and the extendable housing.

25. The recreational vehicle of claim 21, wherein the movement mechanism comprises a carriage that moves the extendable housing wherein the movement mechanism further comprises a rod member attached to the carriage and extending laterally, the rod member adapted to engage the bed at selected instances thereby allowing the bed to move with the extendable housing when the rod member is engaged with the bed.

26. The recreational vehicle of claim 25, wherein the bed defines a latching member adapted to couple to the rod member at selected instances as the rod member moves laterally.

27. The recreational vehicle of claim 26, wherein the latching member defines an aperture dimensioned to allow the rod member to extend therethrough and wherein the movement mechanism further comprises a first and a second movement limiter attached to the rod member at selected locations such that the first and second limiters limit the relative motion of rod member with the bed.

28. The recreational vehicle of claim 27, wherein the first and second limiters are positioned so as to allow the bed to be generally centered laterally when the extendable housing is retracted and when the extendable housing is extended.

29. The recreational vehicle of claim 21, further comprising a closet that is positioned within the extendable housing adjacent the bedroom.

30. The recreational vehicle of claims 29, wherein the movement mechanism couples the bed to the extendable housing such that when the extendable housing is in the retracted position, one side of the bed and the closet define a,first space that is accessible by an occupant, and the other side of the bed is adjacent the second side wall.

31. The recreational vehicle of claim 30, wherein the movement mechanism couples the bed to the extendable housing such that when the extendable housing is in the extended position, one side of the bed and the closet define a first extended space and the other side of the bed and the second side wall define a second extended space, wherein both the first and second extended spaces are dimensioned to be accessible by the occupant.

32. The recreational vehicle of claim 21, wherein the movement mechanism comprises a carriage that moves the extendable housing wherein the movement mechanism further comprises a cog that is attached to the carriage and extends into a laterally extending slot defined by the underside of the bed wherein the slot has a first and a second end and is dimensioned with respect to the cog such that the cog can move laterally between the first and second ends without moving the bed.

33. The recreational vehicle of claim 32, wherein the movement mechanism further comprises rollers attached to the bottom of the bed to allow lateral rolling motion of the bed when the bed is urged to move laterally by the cog engaging and pushing against one of the ends of the slot.

34. The recreational vehicle of claim 20, wherein the recreational vehicle is a motorhome.

35. The recreational vehicle of claim 20, wherein the recreational vehicle is a fifth-wheel trailer.

36. The recreational vehicle of claim 35, wherein the fifth-wheel trailer includes an upper level and a lower level wherein the fifth-wheel trailer comprises a slideout that covers portions of the upper and lower levels and wherein the bedroom is located on the upper level.

37. An apparatus for moving a bed in a bedroom defined by a main housing and an extendable housing of a recreational vehicle, comprising:
   a first means for coupling the extendable housing to the main housing such that the extendable housing can be in a retracted configuration and an extended configuration wherein the extendable housing moves by a first amount when transitioning between the retracted and extended configurations; and
   a second means for coupling the extendable housing to the bed such that the bed moves by a second amount along the direction of motion of the extendable housing when the extendable housing moves by the first amount.

38. The apparatus of claim 37, wherein the first amount is greater than the second amount.

39. The apparatus of claim 38, wherein the first means comprises a carriage that allows the extendable housing to move laterally between the retracted configuration and the extended configuration.

40. The apparatus of claim 39, wherein the second means comprises a movement mechanism that includes a latching member attached to the carriage, the latching member adapted to engage the bed at selected instances thereby allowing the bed to move with the extendable housing when the latching member is engaged with the bed.

41. The apparatus of claim 40, wherein the second means further comprises the bed defining at least one catch adapted to receive the latching member wherein the latching member engaging the catch couples the bed and the extendable housing and wherein the latching member disengaging from the catch uncouples the bed and the extendable housing.

42. The apparatus of claim 39, wherein the second means comprises a movement mechanism that includes a rod member attached to the carriage and extending laterally, the rod member adapted to engage the bed at selected instances thereby allowing the bed to move with the extendable housing when the rod member is engaged with the bed.

43. The apparatus of claim 42, wherein the second means further comprises the bed defining a latching member adapted to couple to the rod member at selected instances as the rod member moves laterally.

44. The apparatus of claim 43, wherein the latching member defines an aperture dimensioned to allow the rod member to extend therethrough and wherein the second means further comprises a first and a second movement limiter attached to the rod member at selected locations such that the first and second limiters limit the relative motion of rod member with the bed.

45. The apparatus of claim 44, wherein the first and second limiters are positioned so as to allow the bed to be selectively positioned laterally within the bedroom when the extendable housing is retracted and when the extendable housing is extended.

46. The apparatus claim 39, wherein the second means comprises a movement mechanism that includes a cog that is attached to the carriage and extends into a laterally extending slot defined by the underside of the bed wherein the slot has a first and a second end and is dimensioned with respect to the cog such that the cog can move laterally between the first and second ends without moving the bed.

47. The apparatus of claim 46, wherein the movement mechanism further comprises rollers attached to the bottom of the bed to allow lateral rolling motion of the bed when the bed is urged to move laterally by the cog engaging and pushing against one of the ends of the slot.

48. The apparatus of claim 47, wherein the slot and the cog are configured to allow the bed to be selectively positioned laterally within the bedroom when the extendable housing is retracted and when the extendable housing is extended.

* * * * *